United States Patent
Choi

(10) Patent No.: US 9,019,073 B2
(45) Date of Patent: Apr. 28, 2015

(54) SYSTEM AND METHOD FOR USER AUTHENTICATION IN IN-HOME DISPLAY

(71) Applicant: LSIS Co., Ltd., Anyang-si, Gyeonggi-do (KR)

(72) Inventor: Seung Woo Choi, Suwon-Si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 16 days.

(21) Appl. No.: 13/645,347

(22) Filed: Oct. 4, 2012

(65) Prior Publication Data

US 2013/0088325 A1    Apr. 11, 2013

(30) Foreign Application Priority Data

Oct. 7, 2011    (KR) .................. 10-2011-0102268

(51) Int. Cl.
| | |
|---|---|
| G06F 7/04 | (2006.01) |
| H04M 1/66 | (2006.01) |
| H04L 9/32 | (2006.01) |
| G06F 21/43 | (2013.01) |
| G06F 21/35 | (2013.01) |
| H04L 29/06 | (2006.01) |

(52) U.S. Cl.
CPC ............. *G06F 21/43* (2013.01); *G06F 21/35* (2013.01); *H04L 63/0853* (2013.01); *H04L 63/18* (2013.01); *G06F 2221/2111* (2013.01)

(58) Field of Classification Search
CPC ..................................................... G06F 7/04
USPC .......... 340/5.61, 5.6; 455/411, 410, 414, 445, 455/552.1; 379/188; 726/9, 5, 7, 8
See application file for complete search history.

(56) References Cited

U.S. PATENT DOCUMENTS

| | | | | |
|---|---|---|---|---|
| 5,596,641 | A  * | 1/1997 | Ohashi et al. ................. | 380/248 |
| 5,668,876 | A  * | 9/1997 | Falk et al. ..................... | 380/271 |
| 6,259,909 | B1 | 7/2001 | Ratayczak et al. | |
| 6,813,496 | B2 * | 11/2004 | Numminen et al. .......... | 455/445 |
| 6,819,917 | B2 * | 11/2004 | Yamauchi ..................... | 455/411 |
| 7,249,110 | B1 * | 7/2007 | Kimura et al. .................. | 705/67 |
| 7,428,987 | B2 * | 9/2008 | Ota et al. ....................... | 235/381 |
| 7,954,137 | B2 * | 5/2011 | Schuba ............................. | 726/3 |
| 8,595,499 | B2 * | 11/2013 | Haider et al. ................. | 713/171 |
| 8,635,684 | B2 * | 1/2014 | Thun ................................. | 726/9 |
| 8,874,899 | B1 * | 10/2014 | Persson et al. ................ | 713/155 |
| 2004/0250135 | A1 * | 12/2004 | Haddad et al. ................ | 713/201 |
| 2010/0306533 | A1 | 12/2010 | Phatak | |
| 2014/0019757 | A1 * | 1/2014 | Mehtala et al. ............... | 713/168 |

OTHER PUBLICATIONS

European Patent Office Application Serial No. 12187600.7, Search Report dated Dec. 21, 2012, 6 pages.

* cited by examiner

*Primary Examiner* — Nam V Nguyen
(74) *Attorney, Agent, or Firm* — Lee, Hong, Degerman, Kang & Waimey

(57) ABSTRACT

A system for authenticating a user of an in-home display (IHD) and an authentication method are provided. A user of an IHD is authenticated by using a mobile terminal including an authentication application. The authentication system receive authentication request data from the mobile terminal and allows the IHD to display a message in relation to user confirmation, and when certain requirements are met, the authentication system performs user authentication to permit a user to use the IHD.

7 Claims, 5 Drawing Sheets

SYSTEM AND METHOD FOR USER AUTHENTICATION IN IN-HOME DISPLAY

CROSS-REFERENCE TO RELATED APPLICATIONS

Pursuant to 35 U.S.C. §119(a), this application claims the benefit of earlier filing date and right of priority to Korean Patent Application No. 10-2011-0102268, filed on Oct. 7, 2011, the contents of which are hereby incorporated by reference herein in its entirety.

1. FIELD OF THE DISCLOSURE

The present disclosure relates to a system and method for user authentication in an in-home display and, more particularly, to a method for authenticating a user of an in-home display by using a mobile terminal.

2. DESCRIPTION OF THE RELATED ART

In general, an in-home display (IHD) refers to a device for checking a usage status of energy in homes. The IHD displays energy consumption and rate (charge) information as an intuitive image, and provides a summary information service such as an estimated rate, analysis, notification, and the like.

In order for an incomer (or a user) to use an IHD provided in a household, the incomer should be identified, so the incomer is required to visit an administration center, or the like, and go through user authentication to confirm whether or not he is an actual incomer, which causes user inconvenience.

FIG. 1 is a view illustrating a configuration of a related art user authentication system.

As illustrated in FIG. 1, when the user directly visits an administration center where a management terminal 100 is present, a supervisor of the administration center checks whether or not the user is a dweller of a corresponding household.

Thereafter, the user is connected to an authentication server 200 via a network by using the management terminal 100, and transmits authentication information for user authentication to the authentication server 200. The authentication server 200 may perform user authentication to allow the corresponding user to use an in-home display (IHD) 300. When the authentication server 200 completes user authentication, the user may use the IHD 300 provided in his home.

However, as mentioned above, the related art user authentication system has the problem in that the user is required to go through the resident confirmation in the administration center, causing user inconvenience.

SUMMARY OF THE DISCLOSURE

An aspect of the present disclosure provides a system and method for user authentication in an in-home display (IHD) capable of simply performing user authentication with respect to the use of an IHD by using a mobile terminal.

In an aspect of the present disclosure, there is provided a method for authenticating a user of an in-home display (IHD) using a mobile terminal, including: transmitting, by the mobile terminal, authentication request data to an authentication server; displaying a message in relation to a user confirmation by the IHD; and performing user authentication, by the authentication server, to permit the user to use the IHD.

The authentication method may further include: receiving a user confirmation by the IHD; and transmitting, by the IHD, authentication complete data to the authentication server.

The authentication method may further include: transmitting, by the authentication server, the authentication request data to the IHD.

The authentication method may further include: transmitting, by the authentication server, a use permission message (or an application permission message) with respect to the IHD to the mobile terminal.

The authentication method may further include: transmitting, by the authentication server, the authentication request data to a management server that manages the IHD.

The authentication request data may include unique information of the mobile terminal and unique information of the IHD.

In another aspect of the present disclosure, there is provided a method for authenticating a user of an in-home display (IHD) using a mobile terminal, including: transmitting, by the mobile terminal, authentication request data to an authentication server; issuing an authentication code by the authentication server; displaying the authentication code by the IHD; receiving, by the mobile terminal, the authentication code and transmitting the same to the authentication server; and performing, by the authentication server, user authentication to permit the user to use the IHD.

In the performing of the user authentication, when the issued authentication code is identical to the authentication code received from the mobile terminal, the use of the IHD may be permitted.

The authentication method may further include: transmitting, by the authentication server, a use permission message with respect to the IHD to the mobile terminal.

The authentication method may further include: transmitting, by the authentication server, the authentication code to a management server that manages the IHD.

The authentication request data and the authentication code may include unique information of the mobile terminal and unique information of the IHD, respectively.

According to embodiments of the present disclosure, user authentication with respect to an IHD can be easily performed through a mobile terminal, overcoming the problem of the related art causing user inconvenience because a user should visit the administration center in order to conform whether or not he is an actual dweller to use an IHD provided in his household.

The foregoing and other objects, features, aspects and advantages of the present disclosure will become more apparent from the following detailed description of the present disclosure when taken in conjunction with the accompanying drawings.

DETAILED DESCRIPTION OF THE DISCLOSURE

Figure 1:
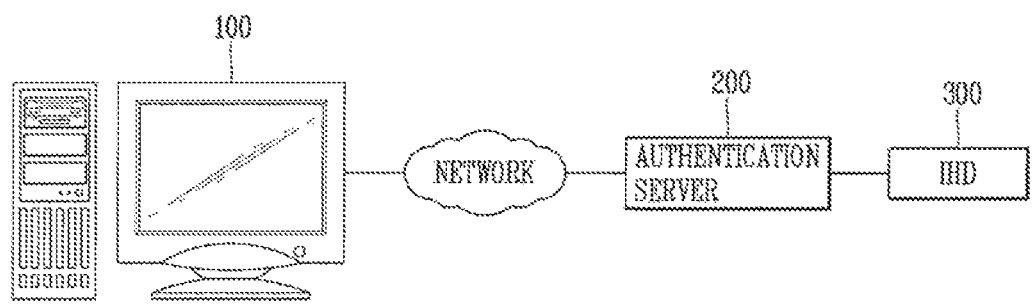
FIG. 1 is a view schematically illustrating a related art user authentication system.
Figure 2:
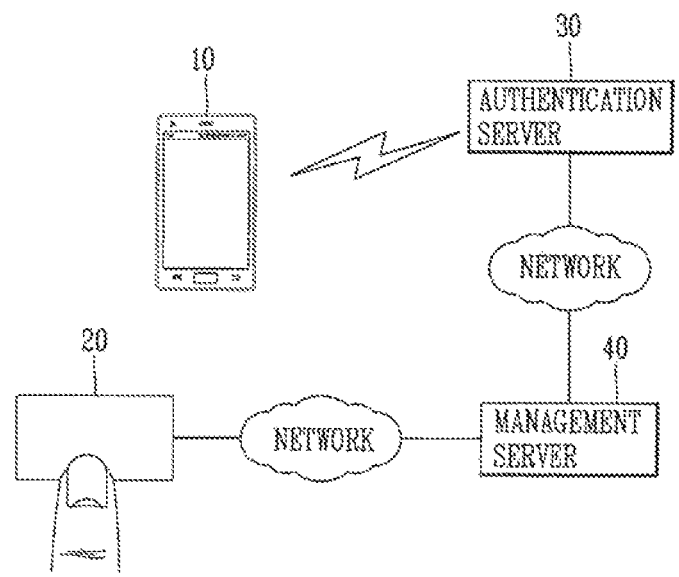
FIG. 2 is a view schematically illustrating a system for authenticating user of an in-home display (IHD) according to embodiments of the present disclosure.

Referring to FIG. 2, a system for authenticating a user of an in-home display (IHD) according to an embodiment of the present disclosure includes a mobile terminal 10 of a user, an IHD 20 provided in home of the user, an authentication server 30 wirelessly connected to the mobile terminal 10 of the user, and a management server 40 connected to the IHD 20 and the authentication server 30 through a fixed line or wirelessly.

Preferably, the mobile terminal 10 is a smart phone, a tablet computer, a laptop computer, or the like. The mobile terminal 10 may be any type of terminal as long as it can be wirelessly connected to the authentication server 30 and perform user authentication of the IHD 20 in the form of an application, or the like, while being carried around by a user.

In order to authenticate the IHD 20, the user may install an application for user authentication (referred to as an 'authentication application', hereinafter) provided by the authentication server 30 in the mobile terminal 10. The user may drive the authentication application to perform authentication on the IHD 20.

The IHD 20 receives power related information from a power server (not shown) and provides the same to allow the user to monitor it. Also, the IHD 20 may receive a user confirmation command for user authentication from the management server 40 operated by the administration center, displays the user confirmation command such that the user can view it, and transmits a user input to the management server 40.

To this end, the IHD 20 may include a display unit including at least one of a liquid crystal display (LCD), a thin film transistor-liquid crystal display (TFT LCD), an organic light emitting diode (OLED), a flexible display, and a 3D display.

Also, a display unit and a sensor (a touch sensor) for sensing a touch operation may form a layered structure (a touch screen), whereby the display unit may also be used as an input device as well as an output device. A description thereof will be omitted.

The authentication server 30 provides the authentication application to the mobile terminal 10 of the user. However, when an application providing server (not shown) is provided, the application providing server may provide an authentication application to the mobile terminal 10. A description thereof will be omitted.

When the user is connected through the authentication application installed in the mobile terminal 10, the authentication server 30 requests user confirmation (or personal certification) from the management server 40. When the user completes user confirmation in the IHD 20, the authentication server 30 receives the user confirmation. The authentication server 30 confirms that the user of the mobile terminal 10 is a user of the IHD 20. After the user confirmation of the authentication server 30, the user is allowed to use the IHD 20. The authentication method of the authentication server 30 will be described in more detail with reference to accompanying drawings later.

The authentication server 30 is connected to the mobile terminal 10 via a wireless network. Other components may be further required to connect the mobile terminal 10 and the authentication server 30 via a wireless network. A description thereof will be omitted.

The management server 40 is operated by the administration center. The management server 40 is connected to the authentication server 30 via a wired/wireless network. Also, the management server 40 is connected to the IHD 20 via a wired/wireless network. When a user confirmation request is received from the authentication server 30, the management server 40 requests user confirmation from the IHD 20. When the user completes user confirmation by using the touch screen of the IHD 20, the management server 40 receives it and transmits it to the authentication server 30.

Hereinafter, a method for authenticating a user by the system for authenticating a user of an IHD according to embodiments of the present disclosure will be described in more detail with reference to the accompanying drawings.

Figure 3:
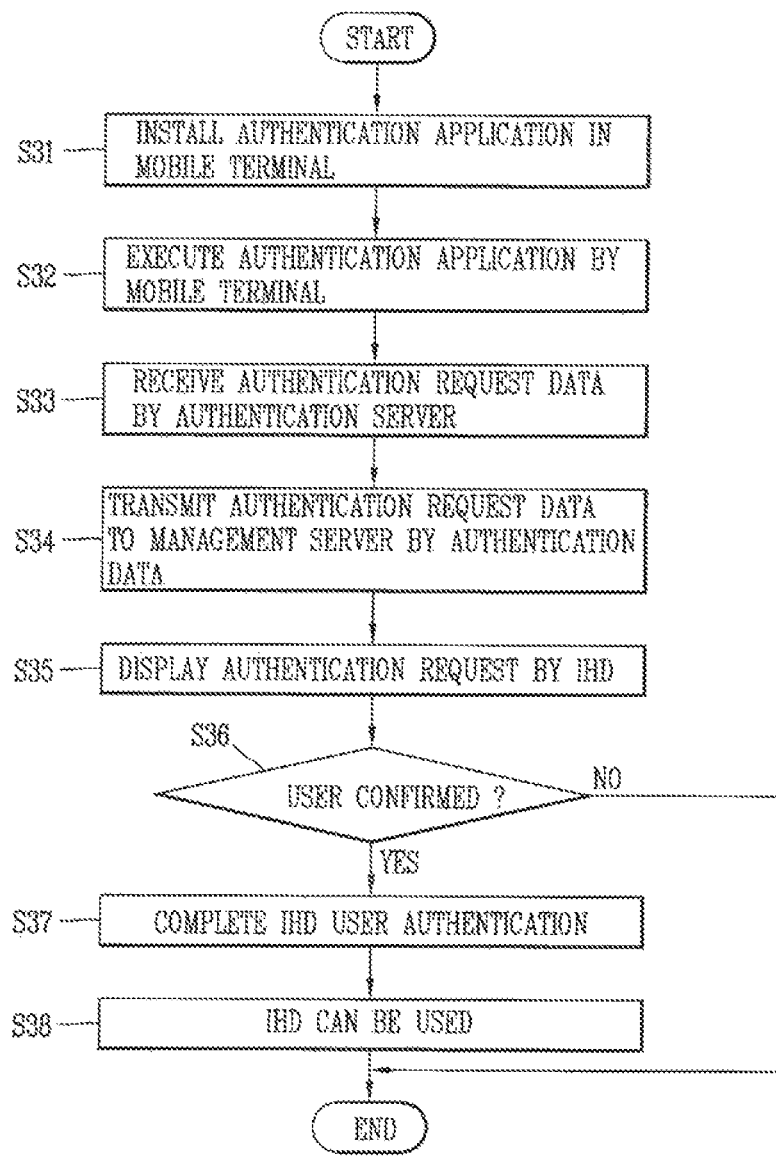
FIG. 3 is a flow chart illustrating a method for authenticating a user of an IHD according to an embodiment of the present disclosure.

FIG. 3 is a flow chart illustrating a method for authenticating a user of an IHD according to an embodiment of the present disclosure.

First, the mobile terminal 10 receives an authentication application provided from the authentication server 30 and installs it (S31).

When the user wants to authenticate the IHD 20, the mobile terminal 10 executes the authentication application (S32). When the authentication application is executed, the mobile terminal 10 is connected to the authentication server 30. The mobile terminal requests the authentication server 30 to perform user authentication by providing information of the IHD 20, namely, by providing a unique number of the IHD 20, on the authentication application. Namely, the mobile terminal 10 transmits authentication request data including the unique information of the IHD 20 to the authentication server 30 (S33).

Here, preferably, the authentication request data includes unique information of the mobile terminal 10 that executes the authentication application, besides the unique information of the IHD 20. Preferably, the unique information of the mobile terminal 10 includes a phone number.

The authentication server 30 receives corresponding authentication request data and transmits the same to the management server 40 that manages the corresponding IHD 20 (S34). In this case, the authentication server 30 may determine the management server 40 (i.e., one of a plurality of management servers) with reference to the unique information of the IHD 20 included in the authentication request data, and transmit the corresponding authentication request data to the corresponding management server.

The management server 40 transmits the authentication request data to the IHD 20. The IHD 40 displays a message related to the authentication request data such that the user can view or read it (S35).

Figure 4:
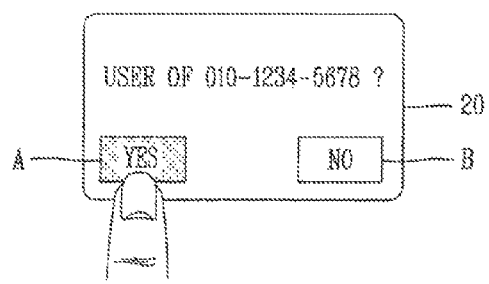
FIG. 4 is a view illustrating an example of an IHD of a user displaying authentication request data-related information according to the authentication method of FIG. 3.

An operation of displaying authentication request data related information on the IHD of the user according to the authentication method of FIG. 3 will be described. When authentication request data with respect to the mobile terminal 10 is received from the management server 40, the IHD 20 may display a message for requesting the user to identify himself by using unique information (e.g., a phone number) of the mobile terminal 10. FIG. 4 shows an example in which the display unit of the IHD displays "user of '010-1234-5678?" to the user. The user may touch a tap (A) "YES" or a tap (B) "NO" displayed on the display unit to inform the IHD 20 that he is a user or not.

In this manner, when the user completes identifying himself on the display unit of the IHD 20 (S36), the IHD 20 transmits 'authentication complete' data to the management server 40. Namely, the management server 40 receives the authentication complete data indicating that the user of the IHD 20 is a user of the mobile terminal 10, from the IHD 20. Also, the management server 40 transmits the authentication complete data to the authentication server 30. The authentication server 30 completes user authentication permitting the user of the corresponding mobile terminal 10 to use the IHD 20 (S37), and thus, the user may use the IHD 20 thereafter.

Here, the authentication server 30 may transmit a message indicating that user authentication has been completed, to the mobile terminal 10 or to the IHD 20.

Through the foregoing authentication method according to an embodiment of the present disclosure, the user can simply perform user authentication of the IHD 20, and completes registration to use the IHD 20.

Figure 5:
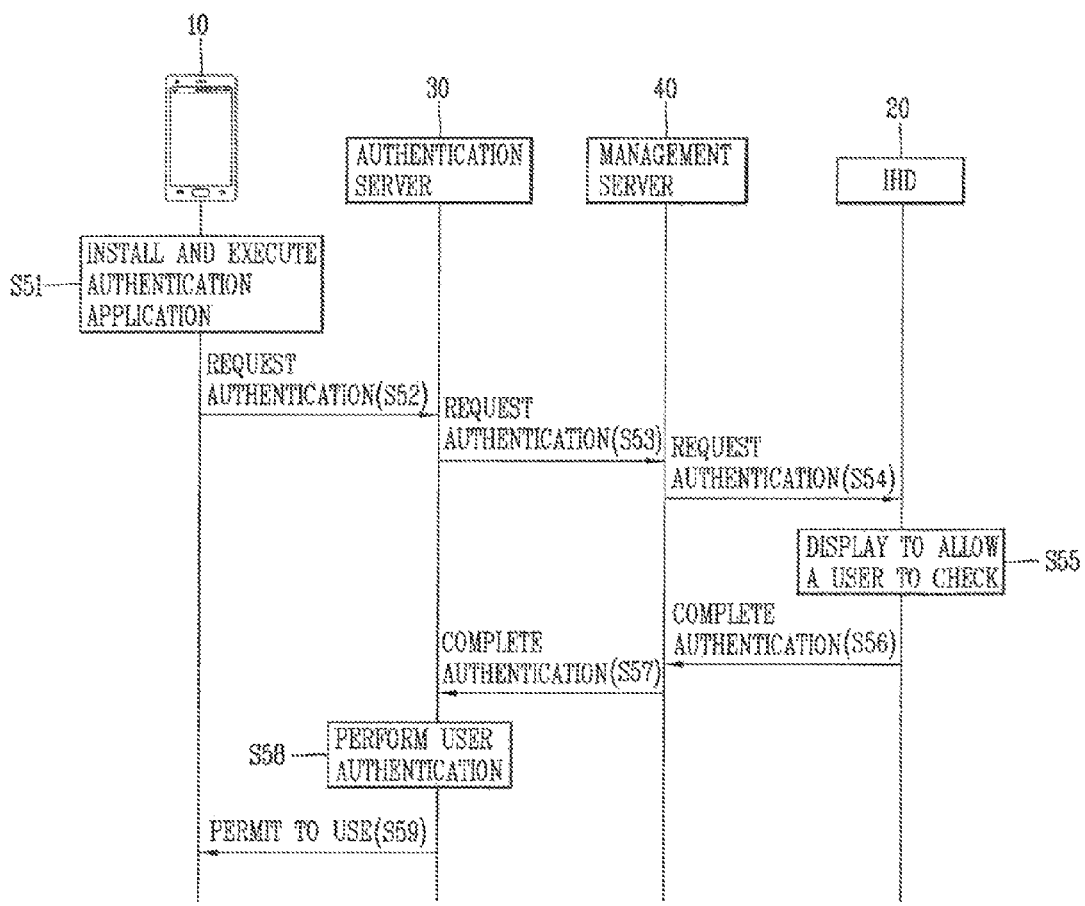
FIG. 5 is a view illustrating a flow of data between components in the authentication method of FIG. 3.

FIG. 5 is a view illustrating a flow of data between components in a method for authenticating a user of an IHD according to an embodiment of the present disclosure. Specifically, FIG. 5 is a view illustrating a flow of data between components in the authentication method of FIG. 3.

When the mobile terminal 10 receives an authentication application provided from the authentication server 30, installs it and executes the authentication application (S51), the authentication application installed in the mobile terminal 10 transmits 'authentication request' data from the authentication server 30 (S52).

Here, the authentication request data includes unique information of the IHD 20 and unique information of the mobile terminal 10.

The authentication server 30 transmits user confirmation request data to the management server 40 that manages the IHD 20 with reference to the unique information of the IHD 20 (S53). The management server 40 transmits authentication request data to the IHD 20 (S54).

The IHD 20 displays the question as shown in FIG. 4 on the display unit such that the user identifies himself (S55). When the user identifies himself as shown in FIG. 4, the IHD 40 transmits 'authentication complete' message to the management server 40 (S56). If the user touches the tap B 'NO' so the user does not identify himself, data transmission and reception may be stopped and the user authentication may also be stopped.

The management server 40 transmits the authentication complete data to the authentication sever (S57). The authentication server 30 confirms that the user of the mobile terminal 10 is the user of the IHD 20, and performs user authentication to permit the user to use the IHD 20 (S58).

Thereafter, the authentication server 30 transmits 'use permission' data (or 'application permission' data) indicating that user authentication has been completed and the user is allowed to use the IHD 20, to the mobile terminal 10 of the user (S59). The mobile terminal 10 displays a message indicating that user authentication has been completed on a display unit so that the user can view or read it.

When the user authentication is completed, the user can read or control power information provided to the IHD 20.

Figure 6:
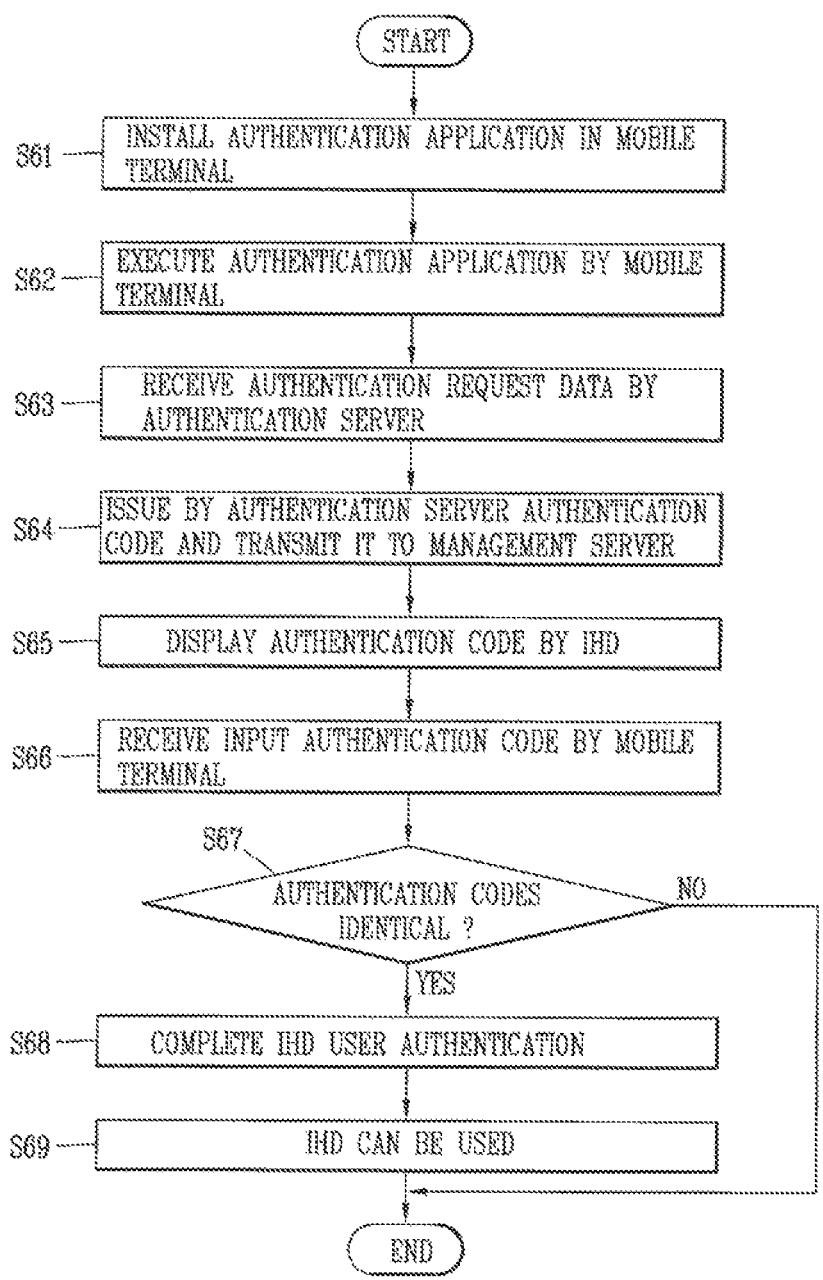
FIG. 6 is a flow chart illustrating a method for authenticating a user of an IHD according to another embodiment of the present disclosure.

FIG. 6 is a flow chart illustrating an authentication method of a system for authenticating a user of an IHD according to another embodiment of the present disclosure.

Referring to FIG. 6, first, the mobile terminal 10 receives an authentication application provided from the authentication server 30 and installs it (S61).

When the user wants to authenticate the IHD 20, the user executes the received authentication application in the mobile terminal 10 (S62). When the user executes the authentication application, the mobile terminal may be connected to the authentication server 30. The mobile terminal requests the authentication server 30 to perform user authentication by providing unique information of the IHD 20, namely, by providing a unique number of the IHD 20, on the authentication application. Namely, the mobile terminal 10 transmits authentication request data including the unique information of the IHD 20 to the authentication server 30 (S63).

Here, preferably, the authentication request data includes unique information of the mobile terminal 10 that executes the authentication application, besides the unique information of the IHD 20. Preferably, the unique information of the mobile terminal 10 includes a phone number.

When the corresponding authentication request data is received, the authentication server 30 issues an authentication code. Also, the authentication server 30 transmits the authentication code to the management server 40 that manages the corresponding IHD 20 (S64). In this case, the authentication server 30 may determine the management server 40 with reference to the unique information of the IHD 20 included in the authentication request data, and transmit a corresponding authentication code. Preferably, the authentication code includes the unique information of the mobile terminal 10 and the unique information of the IHD 20.

The management server 40 transmits the authentication code to the IHD 20. The IHD 20 displays the authentication code such that the user can view or read it (S65).

Thereafter, the user may input the corresponding authentication code in an authentication application of the mobile terminal 10 (S66). The authentication application of the mobile terminal 10 transmits the input authentication code to the authentication server 30. The authentication server 30 compares the authentication code issued in step S64 and the authentication code received from the mobile terminal 10. When the authentication codes are identical, (S67) the authentication server 30 completes user authentication permitting the user of the corresponding mobile terminal 10 to use the IHD 20 (S68), and thus, the user may use the IHD 20 thereafter (S69).

Here, the authentication server 30 may transmit a message indicating that user authentication has been completed, to the mobile terminal 10 or to the IHD 20.

Through the foregoing authentication method according to an embodiment of the present disclosure, the user can simply perform user authentication of the IHD 20, and completes registration to use the IHD 20.

Figure 7:
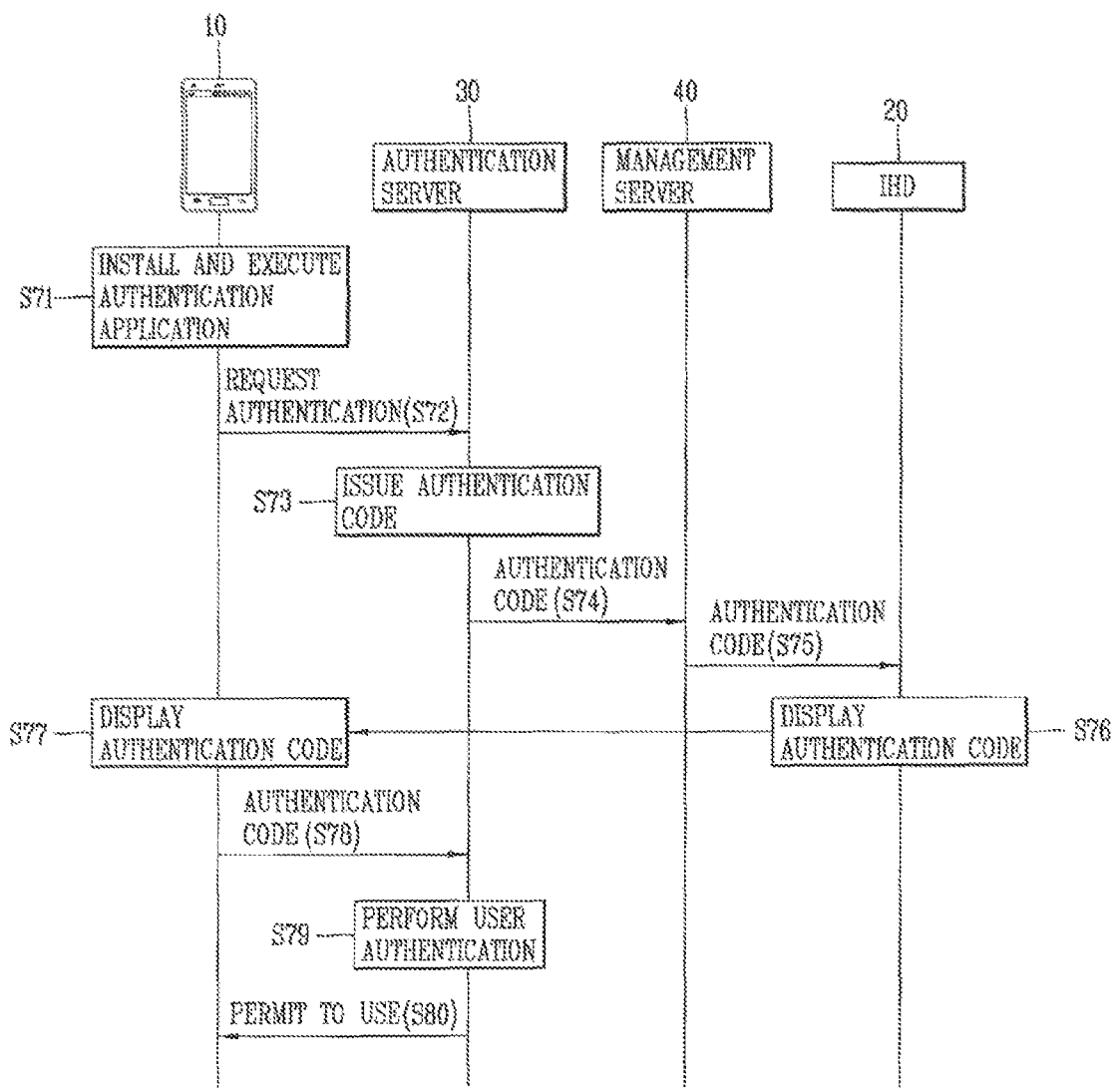
FIG. 7 is a view illustrating a flow of data between components in the authentication method of FIG. 6.

FIG. 7 is a view illustrating a flow of data between components in a method for authenticating a user of an IHD according to another embodiment of the present disclosure. Specifically, FIG. 7 is a view illustrating a flow of data between components in the authentication method of FIG. 6.

When the mobile terminal 10 receives an authentication application provided from the authentication server 30, installs it and executes the authentication application (S71), the authentication application installed in the mobile terminal 10 transmits 'authentication request' data from the authentication server 30 (S72).

Here, the authentication request data includes unique information of the IHD 20 and unique information of the mobile terminal 10.

When the authentication request data is received, the authentication server 30 issues an authentication code (S73). The authentication server 30 transmits the authentication code to the management server 40 that manages the IHD 20 with reference to the unique information of the IHD 20 included in the authentication request data (S74).

The management server 40 transmits the corresponding authentication code to the IHD 20 (S75). The authentication code may also include the unique information of the mobile terminal 10 and the unique information of the IHD 20.

The IHD 20 displays the authentication code on the display unit to allow the user to identify himself (S76). When the user inputs the authentication code displayed on the IHD 20 to the authentication application of the mobile terminal 10 (S77), the authentication application of the mobile terminal 10 transmits the authentication code input by the user to the authentication server 30 (S78).

When the authentication code received from the mobile terminal 10 and the authentication code issued in step S73 are identical, the authentication code 30 completes user authentication permitting the user of the corresponding mobile terminal 10 to use the IHD 20 (S79), and thus, the user may use the IHD 20 thereafter.

Thereafter, the authentication server 30 transmits 'use permission' data indicating that user authentication has been completed and the user is allowed to use the IHD 20, to the mobile terminal 10 of the user (S80). The mobile terminal 10 displays a message indicating that user authentication has been completed on a display unit so that the user can view or read it.

As described above, according to embodiments of the present disclosure, the new incomer of a corresponding household can simply perform user authentication to use an IHD without having to visit an administration center.

Meanwhile, the embodiments of the present disclosure may be implemented by recording a computer-readable program code in a computer-readable recording medium. When the embodiments of the present disclosure are executed by using software, the constituents of the embodiments of the present disclosure are code segments. The program or code segments may be stored in a medium readable by a processor of a computer or may be transmitted by a computer data signal combined with a carrier from a transmission medium or a communication network.

The computer-readable recording medium includes all types of recording devices storing data readable by computer systems. Examples of the computer readable recording medium include ROM, RAM, CD-ROM, magnetic tapes, floppy disks, optical data storage devices, and the like. The computer-readable recording medium may be distributed over network-coupled computer systems so that the computer-readable code may be stored and executed in a distributed fashion.

As the present disclosure may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for authenticating a user of an in-home display (IHD) by using a mobile terminal, the method comprising:
receiving an authentication application provided from an authentication server;
installing the received authentication application in the mobile terminal;
transmitting, by the mobile terminal to the authentication server, authentication request data in order to connect the IHD without requesting user verification information when the authentication application is executed;
transmitting, by the authentication server to a management server that manages the IHD, the authentication request data;
transmitting, by the management server to the IHD, the authentication request data;
displaying, by the IHD, a message in response to receiving the authentication request data, the message requesting a user confirmation;
receiving the user confirmation in response to the displayed message;
transmitting, by the management server to the authentication server, authentication complete data in response to the received user confirmation; and
performing, by the authentication server, user authentication to permit the user to use the IHD,
wherein the management server and the IHD are connected via a local area network, and
wherein the authentication request data includes unique information of the mobile terminal and unique information of the IHD.

2. The method of claim 1, further comprising:
transmitting, by the authentication server to the mobile terminal, a use permission message related to the IHD.

3. A method for authenticating a user of an in-home display (IHD) by using a mobile terminal in a system including an authentication server, the method comprising:
receiving an authentication application provided from an authentication server;
installing the received authentication application in the mobile terminal;
transmitting, by the mobile terminal to the authentication server, authentication request data in order to connect the IHD without requesting user verification information, when the authentication application is executed;
issuing, by the authentication server, an authentication code;
transmitting, by the authentication server to a management server that manages the IHD, the issued authentication code;
transmitting, from the management server to the IHD, the issued authentication code;
displaying, by the IHD, the issued authentication code; and
performing, by the authentication server, user authentication to permit the user to use the IHD when the issued authentication code is identical to an authentication code entered by the user,
wherein the management server and the IHD are connected via a local area network, and
wherein the authentication request data includes unique information of the mobile terminal and unique information of the IHD.

4. The method of claim 3, further comprising:
transmitting, by the authentication server to the mobile terminal, a use permission message related to the IHD.

5. A system for authenticating a user of an in-home display (IHD), the system comprising:
a mobile terminal that has an authentication application transmits authentication request data in order to connect the IHD without requesting user verification information when the authentication application is executed, the authentication application received from an authentication server that is wirelessly connected to the mobile terminal;
the IHD provided in the user's home that displays a message requesting user confirmation in response to receiving the authentication request data; and
a management server that manages the IHD and is connected to the IHD via a local area network; and
wherein the authentication server receives the authentication request data from the mobile terminal, transmits the received authentication request data to the management server, and performs user authentication to permit the user to use the IHD in response to the user confirmation received via the IHD, and wherein the authentication request data includes unique information of the mobile terminal and unique information of the IHD.

6. The system of claim 5, wherein the authentication server performs the user authentication when an issued authentication code and an authentication code received from the mobile terminal are identical.

7. The system of claim 5, wherein the management server transmits authentication complete data to the authentication server when the user confirmation is received.

* * * * *